May 14, 1963 W. R. WOOTTON 3,089,836
PRESSURIZED WATER NUCLEAR REACTOR
Filed Jan. 29, 1958 4 Sheets-Sheet 2

Inventor
William R. Wootton
By
Pennie, Edmonds, Morton, Barrows & Taylor
Attorneys May 14, 1963  W. R. WOOTTON  3,089,836
PRESSURIZED WATER NUCLEAR REACTOR
Filed Jan. 29, 1958  4 Sheets-Sheet 3

Inventor
William R. Wootton
By
Pennie, Edmonds, Morton, Barrows & Taylor
Attorneys May 14, 1963 W. R. WOOTTON 3,089,836
PRESSURIZED WATER NUCLEAR REACTOR
Filed Jan. 29, 1958 4 Sheets-Sheet 4

Inventor
William R. Wootton
By
Pennie, Edmonds, Morton, Barrows & Taylor
Attorneys

United States Patent Office 3,089,836
Patented May 14, 1963

3,089,836
PRESSURIZED WATER NUCLEAR REACTOR
William R. Wootton, London, England, assignor to Babcock & Wilcox Limited, London, England, a British company
Filed Jan. 29, 1958, Ser. No. 712,009
Claims priority, application Great Britain Jan. 31, 1957
12 Claims. (Cl. 204—193.2)

This invention relates to nuclear reactors and to an improved method of removing or inserting elements such as fuel elements or control rods in relation to core-enclosing pressure vessels. In nuclear reactors of the kind utilizing liquid as a coolant which, during operation of the reactor, attains a temperature much higher than its boiling temperature at atmospheric pressure, the necessity arises, when an element is to be removed from the core, of reducing the pressure within the pressure vessel to or substantially to atmospheric pressure and of cooling the pressure vessel and its contents to a temperature below the boiling temperature at atmospheric pressure of the coolant. Since the cooling must be accomplished at a rate such as to avoid objectionable thermal stresses in the pressure vessel and since the temperature of the pressure vessel and its contents must be restored to working temperature before the nuclear reactor is again placed in operation, a considerable period necessarily elapses between the time when the work necessary to replace an element is initiated and the time when the nuclear reactor is available for use as a source of heat for associated heat utilizing apparatus. The ability substantially to reduce this period would be a great advantage.

A known method of removing and inserting fuel elements in relation to the pressure vessel of a nuclear reactor is by means of a movable charging machine arranged to operate through nozzles which afford entry through the walls of the pressure vessel to respective small groups of fuel elements. Such charging machines must be sufficiently accurate to ensure that replacement elements of a group are fed correctly into their respective positions and at the same time sufficiently flexible to ensure that this is so even when there is some slight error in the relative locations of the said positions and the nozzle. The charging machine therefore is costly and difficulties may arise in ensuring the desired positioning of the elements. Furthermore, the provision of nozzles at frequent intervals over an area of a pressure vessel wall tends to make difficult the manufacture of a pressure vessel of adequate strength.

The present invention includes the method of removing or inserting an element such as a fuel element or control rod in relation to the core-enclosing pressure vessel of a nuclear reactor of the kind utilizing liquid as a coolant which during operation of the reactor attains a temperature much higher than its boiling temperature at atmospheric pressure, in which the liquid in the reactor pressure vessel is maintained under pressure, communication is established between the pressure vessel and a relatively small liquid-filled auxiliary pressure chamber, the required movement of the element between the auxiliary pressure chamber and the pressure vessel is effected while the auxiliary pressure chamber is under pressure and the element removed from the pressure vessel is evacuated from or the element to be introduced into the pressure vessel is inserted into the auxiliary pressure chamber while the chamber is isolated from the pressure vessel.

The invention also includes a nuclear reactor of the kind having a core enclosed in a pressure vessel and arranged to be cooled by a liquid coolant, wherein the core is movable within the pressure vessel, means are provided for moving the core to position selectively in operative relation to a common charging and discharging aperture in the vessel any one of a number of stations in the core for the accommodation of respective elements such as fuel elements or control rods and handling means are arranged when a station is operatively positioned in relation to the aperture to effect withdrawal of an element from the station through the aperture or insertion of an element through the aperture and positioning of the element at the station.

The invention will now be described, by way of example, with reference to the accompanying partly diagrammatic drawings, in which.

Figure 1:
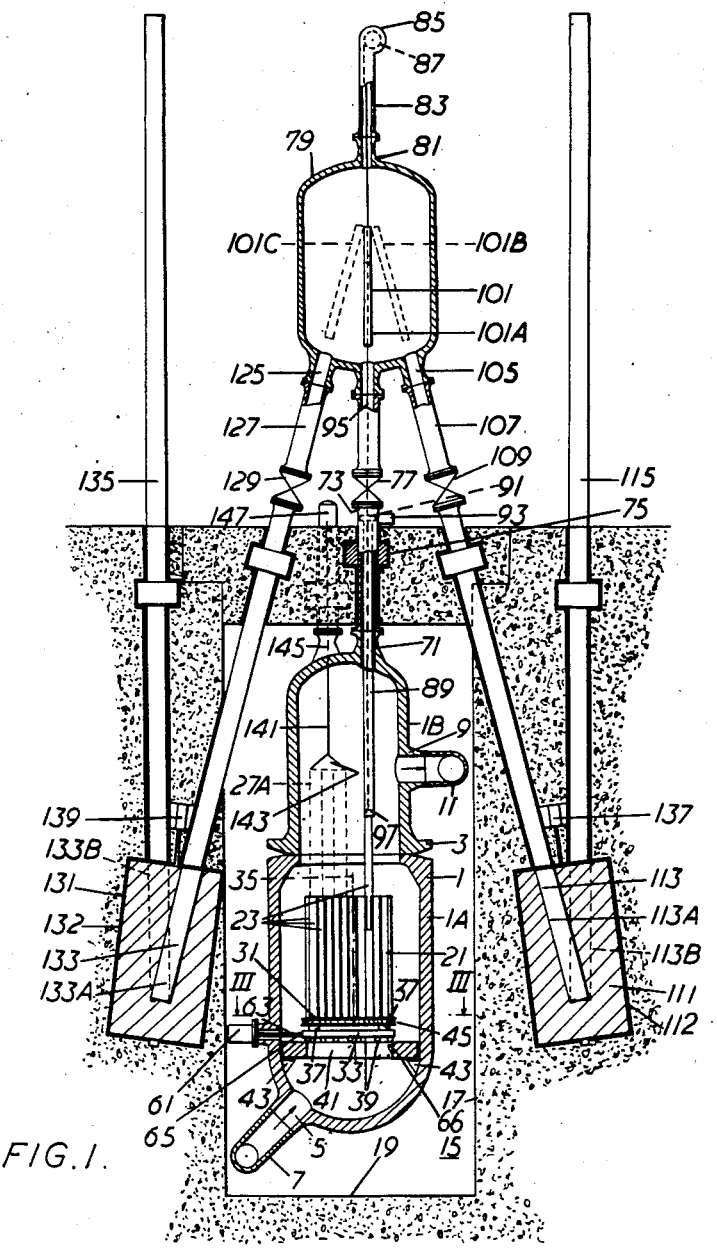
FIGURE 1 is a sectional front elevation of a nuclear reactor of the pressurized water type and of associated fuel element handling means and storage compartments for used elements, taken on the line I—I of FIGURE 3 and as viewed in the direction indicated by the arrows.
Figure 2:
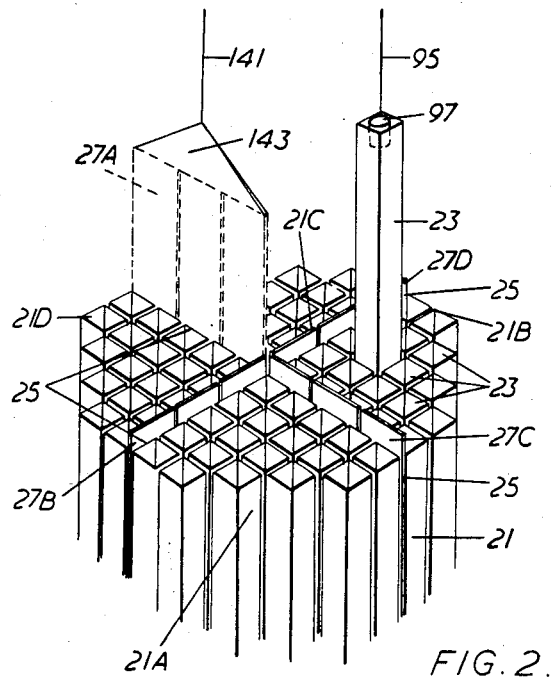
FIGURE 2 is an isometric view of part of a core of the nuclear reactor shown in FIGURE 1, showing the arrangement of the fuel elements in the core.
Figure 3:
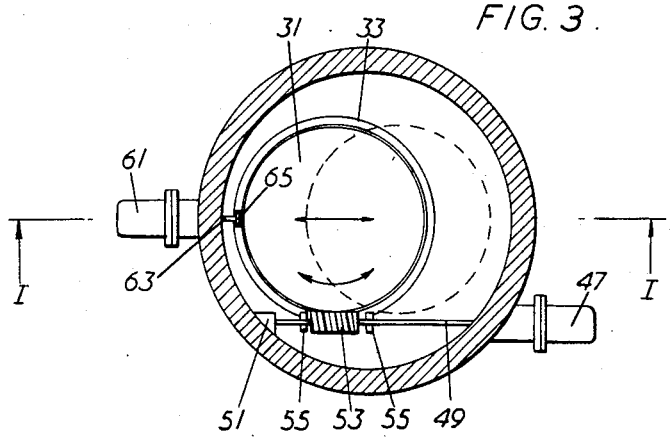
FIGURE 3 is a sectional plan view taken on the line III—III of FIGURE 1.
Figures 5, 6:
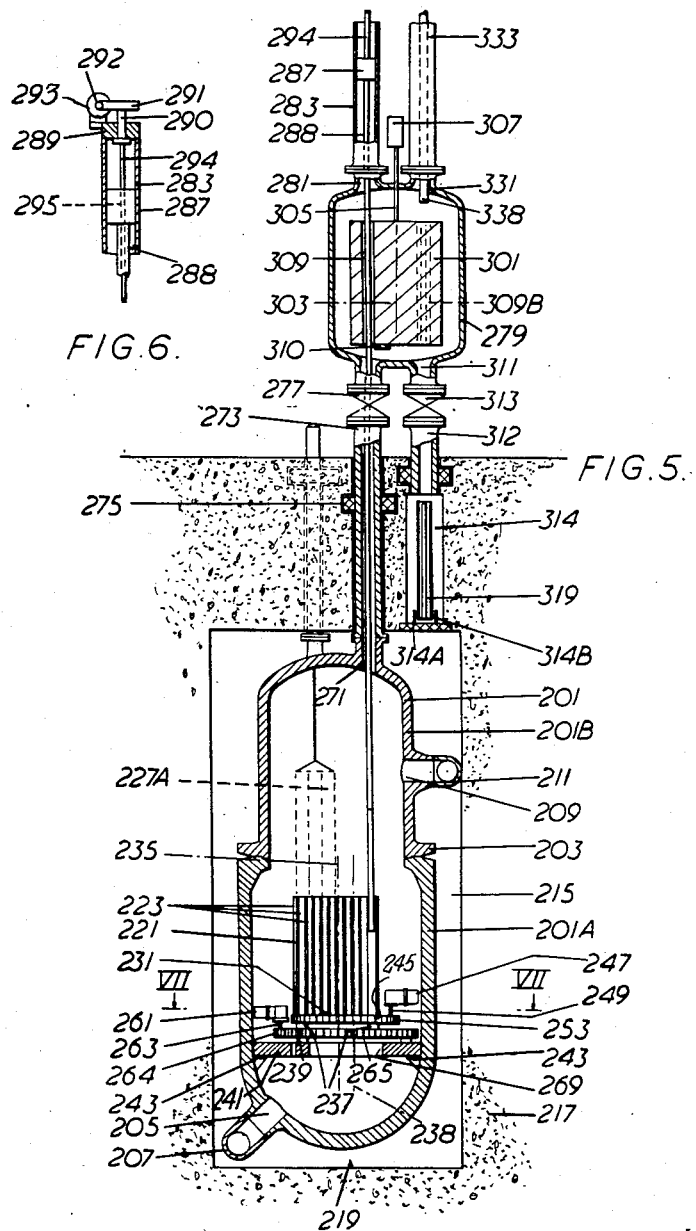
FIGURE 5 is a sectional front elevation taken on the line V—V of FIGURE 4.
FIGURE 6 is a sectional side elevation of an upper part only of a ram cylinder shown in FIGURE 5.
Figure 7:
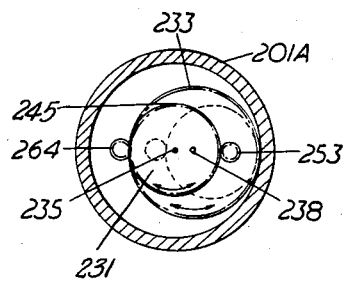
FIGURE 7 is a sectional plan view taken on the line VII—VII of FIGURE 5.
Figure 4:
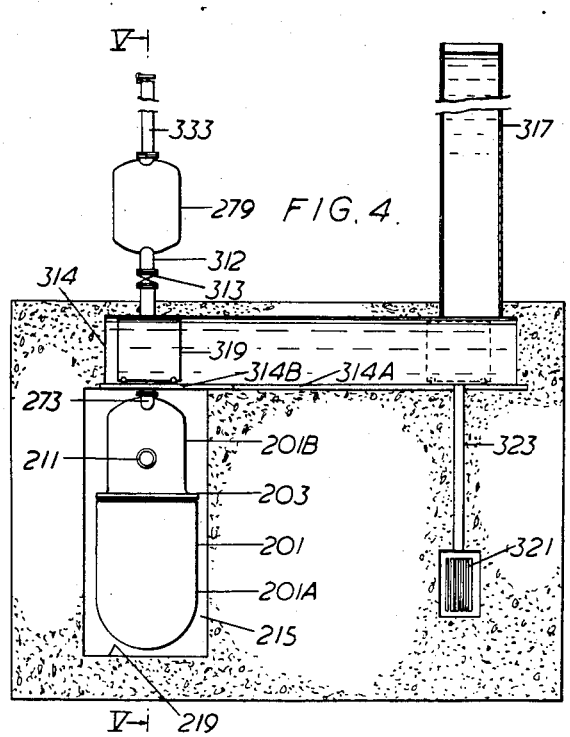
FIGURE 4 is a schematic drawing showing in side elevation a nuclear reactor of the pressurized water type and associated fuel element handling means and a storage compartment for used elements.

Referring first to the embodiment of the invention shown in FIGURES 1 to 3 of the drawings, the nuclear reactor includes a pressure vessel 1 of a vertically elongated generally cylindrical form constructed in two parts, a lower main part or section 1A and an upper cover section 1B of lesser diameter than the main section and provided at its lower end with an outwardly extending flange 3 through which extend bolts (not shown), by which it is secured to the main part. Although not shown, an easily removable circumferential seal weld is provided between the two sections immediately below the flange 3 to ensure fluid tightness at the joint betwen the two sections.

The main section 1A is provided near its bottom with a flanged opening 5 for the admission of cooling water from a pipe 7 welded to the pressure vessel 1, and the cover section 1B is provided at about its mid-height with a flanged opening 9 for the outflow of heated cooling water into a pipe 11 welded to the pressure vessel.

The pressure vessel 1 is disposed within a chamber 15 formed in a concrete biological shield 17, the vessel being supported at its lower end by suitable structural steelwork based on the floor 19 of the chamber 15.

Within the lower main section 1A of the pressure vessel is disposed the reactive core 21 of the nuclear reactor, which core consists of an assembly of fuel elements 23. Each fuel element consists of a group of long narrow plates arranged parallel to one another at a relatively close spacing inside a tube which is rectangular in cross-section and pencil-like in its proportions. Fuel elements of this type are well known in the art. The fuel elements are arranged with their longitudinal axes vertical and the assembly of fuel elements appears roughly circular as viewed from above, the fuel elements being spaced from one another and being disposed in a symmetrical manner leaving a cruciform gap 25 (see FIGURE 2) which divides the fuel elements into four groups, 21A, 21B, 21C and 21D between pairs of which are arranged four groups of neutron-absorbing control plates 27A, 27B, 27C and 27D. In FIGURE 2, the group of control plates 27A is shown in a partly raised position, while the other three groups of control plates are shown in their fully inserted positions in which they tend to reduce the cavity in the core 21 below the critical value. The means for operating the control plates are described in detail below and it will be clear from that description that the illustration of the plate 27A in a partly raised position is only by way of showing the operation of the plates. When, as shown in FIGURE 2, a fuel element is being changed, all the control plates are in their downmost positions.

The core 21 is mounted upon a grid-like turntable 31 itself rotatably mounted on a carriage 33 so as to be capable of rotary movement, relative to the carriage, about an axis indicated at 35, mounting means for the turntable including rollers 37 engaging tracks (not detailed) provided on the turntable and the carriage respectively. The carriage 33 is movable linearly transversely of the pressure vessel. Thus the carriage 33 is in the form of a grid support horizontally movable on rollers 39 running on tracks (not detailed) provided on a main support 41 resting on brackets 43 provided on the interior of the main section 1A of the pressure vessel. The turntable 31 is provided about its periphery with worm wheel teeth 45. A sealed electric driving motor 47 (see FIGURE 3) positioned outside the pressure vessel 1 has a square driving shaft 49 journalled at the end remote from the motor 47 in a bearing 51 secured to the inside of the vessel 1. The driving shaft 49 carried a worm 53 slidable on the shaft 49 but located by lugs 55 provided on the carriage 33 so that the worm 53 is maintained in proper working relationship with the worm wheel teeth 45. Thus operation of the driving motor will through the shaft 49, the worm 53 and the worm wheel teeth 45 cause rotation of the turntable 31 relative to the carriage 33 in the appropriate direction.

A second sealed electric driving motor 61 also positioned outside the pressure vessel 1 and incorporating a speed reducing gear box has a screw-threaded output shaft 63 which extends into the pressure vessel 1 and engages a complementary nut member 65 fixed to the carriage in a non-rotative manner and movable therewith. Thus operation of the driving motor 61 will through the shaft 63 and the nut member 65 cause the carriage 33 to move linearly transversely of the pressure vessel in the appropriate direction.

Each of the motors 47, 61 drives a transmitting device that sends electrical pulses to an indexing apparatus disposed outside the biological shield. By these means, the instantaneous orientation and the position of the core 21 in the pressure vessel are made known to an operator of the nuclear reactor. The main support 41 is formed with a central aperture 66 which directs water flowing upwardly past the support against the open lower ends of the fuel elements 23 of the core 21, and suitable water baffles or seals preclude the escape of the water sidewardly to pass round the outside of the core.

The cover section 1B of the pressure vessel is provided with a single common charging and discharging aperture 71 for the withdrawal of the fuel elements and the replacement of the fuel elements into the core 21. A pipe 73 is welded to the cover section 1B and extends upwardly through the biological shield 17, the pipe being provided with a muff 75 to avoid the possibility of radiation passing through the annular space between the shield 17 and the pipe. Above the shield 17 a parallel slide valve 77 is inserted in the pipe 73, this valve being of the full-bore type to permit the passage of a fuel element through the valve when it is fully opened. The top end of pipe 73 is secured to an auxiliary pressure chamber 79, which is much smaller than the pressure vessel 1, and the top of the chamber 79 is provided with a port 81 to which is secured a cable pipe 83 having at its upper end a chamber indicated at 85 which contains a winch cable drum 87. Disposed in the part of the pipe 73 which lies below the valve 77 is a square section guide tube 89 in which the fuel elements can slide freely but without appreciable rotary movement, the upper end of guide tube 89 being provided externally with worm wheel teeth 91 engaged by a worm (not detailed) on the output shaft of a combined electric motor and gear box unit 93. By operation of the motor unit 93, the orientation of the guide tube 89 in the pipe 73 may be set as desired, and an indicator on the unit 93 indicates that orientation. A winch cable 95 having its upper end wound round the drum 87 extends down into the chamber 79 and is provided at its lower end with an electro-magnetically operated mechanical claw device 97 that is adapted when energized to grip the upper end of a fuel element and thus enable the fuel element to be raised and lowered. The representation of the fuel elements in FIGURE 2 is largely diagrammatic, each fuel element having an open top end into which the claw device 97 can be lowered before it is activated to expand and grip the wall of the said open end.

Within the auxiliary pressure chamber 79 is a tubular guide 101 through which the winch cable 95 passes, the guide being provided with actuating means (not detailed) by means of which the guide may be moved from alignment with the pipe 73, as indicated at 101A, to a charge position, indicated at 101B or to a discharge position, indicated at 101C.

The auxiliary pressure chamber 79 is provided at its bottom with charge aperture 105 from which extends a straight charging transfer pipe 107 provided with a full-bore parallel slide stop valve 109 and extending into the biological shield 17 to a rotary magazine 111 rotatably mounted in a chamber 112. The axis of the magazine 111 is inclined to the vertical at half the angle of inclination of the pipe 107 to the vertical, and the magazine includes a transfer chamber 113 which, upon rotation of the magazine, moves from the position 113A in which it is in alignment with the pipe 107 to a diametrically opposite position 113B in which the axis of the chamber 113 is vertical.

A charge pipe 115 extends from a level above that of the winch drum chamber 85 vertically into the biological shield 17 and terminates at the magazine chamber 112 in alignment with the transfer chamber 113 when that chamber is at the position indicated by 113B.

In a similar manner, the auxiliary pressure chamber 79 is provided at its bottom with a discharge aperture 125 from which extends a straight discharge transfer pipe 127 provided with a full-bore parallel slide stop valve 129 and extending into the biological shield 17 to a rotary magazine 131 rotatably mounted in a chamber 132. The axis of the magazine 131 is inclined to the vertical at half the angle of inclination of the pipe 127 to the vertical, and the magazine includes a transfer chamber 133 which, upon rotation of the magazine, moves from the position 113A in which it is in alignment with the pipe 127 to a diametrically opposite position 133B in which the axis of the chamber 133 is vertical. A discharge pipe 135 extends from a level above that of the winch drum chamber 85 vertically into the biological shield 17 and terminates at the magazine chamber 132 in alignment with the transfer chamber 133 when that chamber is at the position indicated by 133B.

Rotary magazine 111 and rotary magazine 131 are respectively provided with electric motors 137, 139 by which they may be set under control of appropriate limit switches to either of their operative positions shown, as desired.

The groups of control plates 27A, 27B, 27C and 27D are separately operable, by rams extending through the cover section 1B of the pressure vessel to ram cylinders disposed outside the pressure vessel. Only the operating means for the plates 27A are indicated in the drawings, and these consist of a ram 141 provided at its lower end with an electro-magnetically operated holding device 143 and extending upwardly through a nozzle 145 in the cover section 1B into a ram cylinder 147. Operation of the ram 141 causes vertical movement of the holding device 143, and the travel of the ram is limited by suitable limit switches controlling the motor so that, if the holding device 143 is energized to hold the group of plates 27A and is then raised to the limit of its travel, the lower ends of the control plates do not leave the arm of the cruciform gap 25 in which they operate. If the holding device 143 is de-energized, the control plates 27A are released and will remain in, or fall to, their fully inserted lowermost position. The operating means for the other control plates is similar to that described for the group of control plates 27A.

The nuclear reactor is utilized for power generation, and to that end the pipes 7 and 11 are connected to a tubular heat exchanger of the indirect type (not shown) for the generation of steam which is utilized in a steam turbine. Such an arrangement of a nuclear reactor of the pressurized water type is well known in the art.

During operation of the nuclear reactor as a source of heat for power generation, a flow of water is maintained by pumps into the pressure vessel 1 through the inlet 5 and out of the pressure vessel through the outlet 9. The valves 77, 109 and 129 are maintained fully closed, the cable 95 being wound up onto the drum 87 so that the claw device 97 is within the auxiliary pressure chamber 79. The core 21 is disposed centrally of the main section 1A of the pressure chamber 1 so that it is surrounded by an annular belt of the cooling water which thus acts as a neutron reflector and the orientation of the turntable 31 relative to the carriage 33 is such that each of the control plates 27A, 27B, 27C and 27D is immediately below the ram of the associated operating means. Thus by lowering of the ram 141 with the holding device 143 energized the group of control plates 27A is coupled to the ram 141, and the control plates 27A can be raised or lowered as necessary to regulate the intensity of the nuclear reaction in the core. The other control plates are similarly coupled to the rams of their associated operating means.

Water flowing upwardly through the pressure vessel 1 from the inlet 5 passes through the central aperture 66 in the main support 41 and enters the open lower ends of the fuel elements and flows through each fuel element between the plates thereof, extracting heat generated in the plates by the nuclear reaction. This heated water leaves the pressure vessel through the outlet 9 and passes to the heat exchanger.

The pressure of the water in the pressure vessel 1 is maintained at about 1500 pounds per square inch, and the water leaves the pressure vessel at a temperature of about 500° F. Under these conditions of temperature and pressure, the water does not turn into steam.

The auxiliary pressure chamber 79, the magazine chambers 112 and 132 and the vertical pipes 115, 135 are maintained filled with water.

After a period of normal operation, it will become necessary to replace some, and usually all, of the fuel elements in the core 21. To do this, the nuclear reactor is first rendered non-critical by lowering of all the control plates 27A, 27B, 27C and 27D to their lowermost positions, and de-energizing the holding devices, such as the device 143, so that the control rod operating rams such as the ram 141, may be withdrawn upwardly clear of the core. The pumps which cause the circulation of cooling water to and from the pressure vessel 1 are closed down in a progressive manner until the rate of flow of water is only that necessary to ensure that the water in the cooling circuit does not become stagnant and thus possibly develop a cold zone which later would cause difficulty in operation of the reactor. The pressure in the auxiliary pressure chamber 79 is brought up to that existing in the pressure vessel 1 by a pump which forces feed water into chamber 79. The valve 77 is then opened and the claw device 97 is lowered by the cable 95 through the valve 77 and the guide tube 89 into the pressure vessel 1.

The driving motors 47 and 61 are now energized appropriately to bring the fuel element to be removed below the aperture 71 in the pressure vessel cover section 1B. This operation of indexing the station of the fuel element to be removed, below the aperture 71, is made possible by the indexing means associated with the motors 47 and 61, by which the operator of the motors is given a positive indication of the orientation and lateral position of the core 21. As will be clear from a consideration of FIGURE 2, for each fuel element station in the core the orientation of the square faces of the fuel element, when that element is positioned for withdrawal from the core, will be some specific quantity, so that the operator, knowing which element he is about to remove, will know what orientation to give to the guide tube 89 in order that the square bore of that tube shall be properly oriented to receive the fuel element. The guide tube 89 is properly oriented by operation of the motor unit 93 and observation of the indicator thereon. The claw device 97 is then lowered into the upper end of the fuel element, the device is energized to cause it to grip the element, and the cable 95 raised to bring the upper end of the fuel element into the lower end of the guide tube 89, which is slightly flared to facilitate entry by the element. The fuel element is now drawn by the cable 95 up into the auxiliary pressure chamber 79, the valve 77 is closed, and the pressure in chamber 79 reduced to approximately that of the ambient atmosphere. Since the whole of the chamber 79 and the cable pipe 83 is maintained flooded with water at all times, the amount of water required to change the pressure in the chamber 79 is very small.

The valve 129 is now opened, the tubular guide 101 is swung from the position 101A to the position 101C, and the cable 95 paid out from the drum 87 so that the used fuel element passed down through the pipe 127 and the valve 129 into the transfer chamber 133 of the rotary magazine 131, which is in the position 133A ready to receive the element. The claw device 97 is now de-energized to enable it to be withdrawn back into the auxiliary pressure chamber 79, leaving the fuel element in the chamber 133, while the magazine 131 is rotated to bring the chamber 133 into the position 133B, at which a cable supported claw device similar to the device 97 lowered down through the discharge pipe 135 is able to engage the fuel element and remove it upwardly through the pipe 135 for disposal.

The tubular guide 101 is now swung to the position 101B, the valve 129 closed, and the valve 109 opened. No equalization of pressures is necessary before these valves are operated. A new fuel element is fed by a cable supported claw device similar to the device 97 into the chamber 113 of the magazine 111 through the pipe 115 while the chamber 113 is in the position 113B, the magazine is rotated to the position 113A, and the claw device 97 lowered down through the aperture 105, the pipe 107 and the valve 109 to engage that new fuel element, which is then drawn by the cable 95 up into the auxiliary pressure chamber 79. The valve 109 is now closed, the pressure in the chamber 79 brought up by the associated pump to that in the pressure vessel 1, the valve 77 opened, and the new fuel element lowered by the cable 95 through the guide tube 89 into the station in the core 21 vacated by the element which was removed. The claw device 97 is then de-energized and lifted somewhat, the motors 47 and/or 61 operated as necessary to bring the next fuel element which it is desired to replace underneath the aperture 71, and the fuel element removal and replacement processes described above repeated. The range of movements of the turntable and the carriage are sufficient to permit each fuel element station in the core to be brought under the aperture 71.

When all the fuel elements, or all the fuel elements it is desired to change, have been replaced with new elements, the cable 95 is drawn up to bring the claw device 97 into the auxiliary pressure chamber 79, and the valve 77 is closed. The core 21 is rotated and moved by the motors 47 and 61 to its normal operating position in the pressure vessel 1, and the rams, such as the ram 141, of the control plate operating means are lowered to and coupled to the control plates. The pumps for maintaining the water flow through the pressure vessel 1 are brought up to full speed and by movement of the control plates 27A, 27B, 27C and 27D the core 21 is rendered critical. The nuclear reactor can now revert to its normal function of heat generation, although the time taken to restore full working temperature must depend upon the need to avoid thermal shock in the parts of the apparatus.

Although in the arrangement shown it was considered unnecessary to provide for removal of the control plates 27 through the aperture 71, clearly by making each control plate somewhat narrower than shown and adapting each control plate at its upper end for gripping by the claw device 97, control plates may be removed and replaced one at a time without cooling down and de-pressurization of the main pressure vessel 1.

Referring now to the embodiment of the invention shown in FIGURES 4 to 7 of the drawings, the nuclear reactor includes a pressure vessel 201 of a vertically elongated generally cylindrical form constructed in two parts, a lower main part or section 201A and an upper cover section 201B of lesser diameter than the main section and provided at its lower end with an outwardly extending flange 203 through which extend bolts (not shown), by which it is secured to the main part. Although not shown, an easily removable circumferential seal weld is provided between the two sections immediately below the flange 203 to ensure fluid tightness at the joint between the two sections.

The main section 201A is provided near its bottom with a flanged opening 205 for the admission of cooling water from a pipe 207 welded to the pressure vessel 201, and the cover section 201B is provided at about its mid-height with a flanged opening 209 for the outflow of heated cooling water into a pipe 211 welded to the pressure vessel.

The pressure vessel 201 is disposed within a chamber 215 formed in a concrete biological shield 217, the vessel being supported at its lower end by suitable structural steelwork based on the floor 219 of the chamber 215.

Within the lower main section 201A of the pressure vessel is disposed the reactive core 221 of the nuclear reactor, which core consists of an assembly of fuel elements 223. Each fuel element consists of a group of long narrow plates arranged parallel to one another at a relatively close spacing inside a tube which is rectangular in cross-section and pencil-like in its proportions. Fuel elements of this type are well known in the art. The fuel elements are arranged with their longitudinal axes vertical and the assembly of fuel elements appears roughly circular as viewed from above, the fuel elements being spaced from one another and being disposed in a symmetrical manner leaving a cruciform gap which divides the fuel elements into four groups between pairs of which are arranged four groups of neutron-absorbing control plates such as the control plate 227A (see FIGURE 5). This arrangement of the fuel elements and control plates is similar to that shown in, and described above with reference to FIGURE 2.

The core 221 is mounted upon a grid-like upper turntable 231 itself rotatably mounted on a grid-like carriage or lower turntable 233 so that the upper turntable 231 is capable of rotary movement, relative to the lower turntable, about an axis indicated at 235, mounting means for the upper turntable including rollers 237 engaging tracks (not detailed) provided upon the upper turntable and the lower turntable respectively. The lower turntable 233 is mounted for rotation about an axis 238 which is parallel to but offset from axis 235 and the axis of the pressure vessel 201. The turntable 233 runs on rollers 239 engaging tracks provided on the turntable 233 and on a main support 241 resting on brackets 243 provided on the interior of the main section 201A of the pressure vessel. The upper turntable 231 is provided about its periphery with spur gear teeth 245. A sealed electric driving motor 247 incorporating reduction gearing is positioned inside the pressure vessel, is suitably mounted on the lower turntable 233 and has an output shaft 249 provided with a spur gear wheel 253 arranged in proper working relationship with the gear wheel teeth 245. The gear wheel 253 and the gear teeth 245 form a reduction gearing. It will be seen that operation of the driving motor will through the shaft 249, the gear wheel 253 and the gear teeth 245 cause rotation of the upper turntable 231 relative to the lower turntable 233 in the appropriate direction about the axis 235.

A second sealed electric driving motor 261 is positioned inside the pressure vessel 201 and mounted on the inside of the wall thereof and incorporates a speed reducing gear box with an output shaft 263 which carries a spur gear wheel 264 arranged to engage spur gear teeth 265 provided about the periphery of the lower turntable 233. It will be seen that operation of the driving motor 261 will through the shaft 263, the gear wheel 264 and the gear teeth 265 cause the lower turntable 233 to rotate relative to the pressure vessel 201 about the axis 238 in the appropriate direction.

Electrical power leads for the two motors 247, 261 extend through the wall of the pressure vessel. Furthermore, each of the motors 247, 261 drives a transmitting device that, as the motor rotates, sends electrical pulses out through conductors passing through the wall of the pressure vessel to an indexing apparatus disposed outside the biological shield. By this means, the orientation of the lower turntable 233 relative to the pressure vessel and the orientation of the upper turntable 231 relative to the lower turntable 233 are made known to an operator of the nuclear reactor.

The main support 241 is formed with a central aperture 269 which directs water flowing upwardly past the support against the open lower ends of the fuel elements 223 of the core 221, and suitable water baffles or seals preclude the escape of water sidewardly to pass round the outside of the core.

The cover section 201B of the pressure vessel is provided with a single common charging and discharging aperture 271 for the withdrawal of the fuel elements from and the replacement of the fuel elements into the core 221. A pipe 273 is welded to the cover section 201B and extends upwardly through the biological shield 217, the pipe being provided with a muff 275 to avoid the possibility of radiation passing through the annular space between the shield 217 and the pipe. Above the shield 217 a parallel slide valve 277 is inserted in the pipe 273, this valve being of the full-bore type to permit the passage of a fuel element through the valve when it is fully opened. The top end of pipe 273 is secured to an auxiliary pressure chamber 279 which is much smaller than the pressure vessel 201, and vertically above the pipe 273 the top of the chamber 279 is provided with a port 281 from which extends a tall ram cylinder 283. Disposed within the cylinder 283 is a ram piston 287 to which is secured a ram 288, and a pump is provided for the admission of water to the part of the cylinder 283 above the piston 287 and for the controlled removal of water from that part of the cylinder. This pump supplies water under a pressure greater than the operating pressure of the water in the pressure vessel. The lower end of the ram 288 is provided with the male part of a bayonet coupling, and each fuel element at its upper end is formed as a complementary female part of the bayonet coupling. To permit controlled rotation of the ram 288 when the coupling is to be made or broken, and to permit correct orientation of a square fuel element for the station in the core 221 into which it is to be inserted, the top cover 289 of the cylinder 283 is provided with a gland through which extends a rotary operating spindle 290. The upper end of spindle 290 carries a worm wheel 291 engaging a worm 292 driven by an electric motor 293 incorporating a speed reducing gear box, and the lower end of spindle 290 is continued as a rod 294 of square cross-section which fits into a square hole 295 in piston 287 and extends into the ram 288, which over only the upper part of its length is hollow. Operation of the motor 293 will cause rotation of the ram 288 through a small angle under the control of suitable limit switches. An indicator on the motor 293 indicates the instantaneous orientation of the ram 288 relative to the pressure vessel 201.

Within the auxiliary pressure chamber 279 is a rotary magazine 301 suitably mounted in the chamber for rotation about a vertical axis 303 and coupled to an output shaft 305 of a combined electric motor and reduction gear box unit 307 disposed outside the chamber. The magazine 301 is formed with a vertical transfer chamber 309 which in one position of the magazine is in alignment with the ram 288. Chamber 309 is of sufficient size to permit the free passage of a fuel element 223 but is too small to permit the fuel element to rotate. A shutter 310 provided on the bottom of the magazine is movable by a control situated outside the chamber 279 from the position shown to a position in which it supports a fuel element which is inside the transfer chamber 309.

The auxiliary pressure chamber 279 is provided at its bottom with a transfer aperture 311 from which extends a vertical transfer pipe 312 provided with a full-bore parallel slide stop valve 313 and extending into the biological shield as far as the roof of a horizontal conduit 314 which extends laterally from above the chamber 215 to a location below a water tower 317 (see FIGURE 4) which extends upwardly from the conduit 314 to a level somewhat higher than the top of the ram cylinder 283. The floor 314A of this conduit is formed as a guiding track for a wheeled carriage 319 provided with a driving cable (not detailed) by which it may be moved as desired between a plurality of loading and unloading stations under the pipe 312 and a plurality of loading and unloading stations under the water tower 317. Above the chamber 215 the floor 314A includes a lead shield 314B. Below the water tower 317 is disposed a rotary magazine 321, for used fuel elements, provided with suitable motor means for bringing chambers of the magazine below the lower end of a vertical pipe 323 communicating with the conduit 314 immediately below the loading and unloading position of the carriage 319.

The carriage 319 includes four vertical square tubes each adapted to take one of the square-section fuel elements and hold it against rotation, each tube being provided at its bottom with a remotely operable sliding shutter which may be opened to permit the passage of the element or closed to retain the fuel element in place in the tube of the carriage as desired.

The roof of the auxiliary pressure chamber 279 is provided with a port 331 immediately above the transfer chamber 309 when it is in the position indicated at 309B above the transfer aperture 311. A ram cylinder 333 provided with a ram piston and a ram 338 extends upwardly from the port 331, the ram being similar to, and provided with operating means similar to those provided for, the ram 288, although the ram 338 is of somewhat shorter travel than the ram 288.

The arrangement and the means for operating the control plates such as the plate 227A are similar to those described above with reference to FIGURES 1 to 3, and as in that embodiment of the invention the pipes 207 and 211 are connected to a tubular heat exchanger of the indirect type (not shown) for the generation of steam which is utilised in steam turbines.

The normal operation of the nuclear reactor described above with reference to FIGURES 4 to 7 is similar to that of the embodiment of the invention shown in FIGURES 1 to 3, the upper turntable 231 and the lower turntable 233 being so oriented in the pressure vessel 201 that the core 221 is centrally located in the pressure vessel so that it is surrounded by an annular belt of the cooling water, and the valves 277 and 313 being closed. The auxiliary pressure chamber 279, the conduit 314 and the water tower 317 are maintained filled with water.

When it becomes necessary to replace some or all of the fuel elements in the core 221, the nuclear reactor is rendered non-critical, the control plate rams raised clear of the control plates and the circulation pumps set to give but a small circulation of the coolant water.

The pressure in the auxiliary pressure chamber 279 is raised to that existing in the pressure vessel 201 by a pump which forces feed water into that chamber. The valve 277 is then opened and the ram 288 lowered through the valve 277 into the pressure vessel 201.

The driving motors 247 and 261 are now energized appropriately to bring the fuel element to be removed below the aperture 271 in the pressure vessel cover section 201B. This operation of indexing the station of the fuel element to be removed, below the aperture 271, is made possible by the indexing means associated with the motors 247 and 261, by which the operator of the motors is given a positive indication of the orientation of the upper and the lower turntables, and thus of the disposition of the core 21 in the pressure vessel and of its orientation therein. As described above in connection with the embodiment of FIGURES 1 to 3, this operator is also made aware of the orientation of the square faces of the fuel element, so that he can rotate the ram 288 by appropriate energization of the motor 294 to bring the bayonet fixing on the ram into the correct entry position for the fuel element 223 to be removed. By operation of the pump which feeds water into the cylinder 283 above the piston 287, the ram 288 is forced down to engage the bayonet fitting on the upper end of the fuel element to be removed, is rotated by means of the motor 293 to operate the bayonet coupling, and by reverse operation of the pump to evacuate water from above the piston 287, the ram is caused to move upwardly taking the fuel element with it. During this upward movement the ram is turned to a zero position in which the square sides of the fuel element are aligned with the sides of chamber 309 in magazine 301. The fuel element is raised until it is inside the auxiliary pressure chamber 279 and within the chamber 309 in the magazine 301, and the shutter 310 is brought across to close the lower end of the chamber. The ram 288 is now rotated to unlock the bayonet coupling, the fuel element being held against rotation by the sides of the square chamber 309 and the fuel element being supported, once the ram 288 is disengaged, by the shutter 310. The ram 288 is now raised a short distance to clear the top of the magazine 301.

Valve 277 is closed, the pressure in the auxiliary pressure chamber 279 reduced by reverse operation of the associated feed pump, and when the pressure is reduced to approximately atmospheric pressure, the valve 313 is opened. The magazine 301 is now rotated by the motor 307 until the transfer chamber 309 is vertically above the transfer aperture 311, in the position 309B. The ram 338 is now lowered to engage the fuel element, is turned to lock the bayonet coupling, the shutter 310 is moved aside to leave the fuel element supported by the ram 338, the ram is lowered to pass the fuel element down through the pipe 312 and the valve 313 into one of the square tubes in the carriage 319, the shutter associated with that tube being closed, the ram 338 is rotated to unlock the bayonet coupling and the ram raised into the auxiliary pressure chamber 279 above the magazine 301, and the valve 313 closed.

The above operations are then repeated to remove a second desired fuel element, the carriage 319 being moved along to enable a second of the square tubes therein to be brought into alignment with the pipe 312 to receive this second fuel element. A third and a fourth fuel element are stored in the carriage in this manner, and the carriage then moved along the conduit 314 to unloading positions above the magazine 321, at which the four fuel elements are respectively unloaded into the magazine, and four new elements put into the carriage through the water tower 317 by a ram (similar to the rams 288 and 338).

These new elements are fed into the core 221 by a suitable modification of the procedure described above for removing elements from the core. Thus with valve 277 closed, valve 313 open, the auxiliary presure chamber 279 at approximately the pressure of conduit 314 and with the ram 338 extending through the pipe 312 after the removal of the fourth element, when the carriage 319 is positioned below the ram 338 and containing four new elements the ram 338 is used to transfer one of the elements into the magazine 301 and is then raised somewhat. The valve 313 is then closed, the magazine 301 turned to the position shown in FIGURE 5, the auxiliary pressure chamber 279 is brought up to the pressure existing in the pressure vessel 201, valve 277 is opened, and the ram 288 is utilized to transfer the new element to the appropriate station in the reactor core 221. The ram 288 is then fully raised, valve 277 closed, the auxiliary pressure chamber 279 depressurized down to the pressure in the conduit 314, valve 313 is opened, the magazine 301 rotated to bring the transfer chamber 309 into the position 309B, and the ram 338 utilized to raise a second of the new elements from the carriage, which has been moved slightly to a suitable position under the pipe 312, into the transfer chamber 309. By continuing this process, the four new elements may be placed in the four stations of the core 221 which were vacated by the four old elements removed and stored in the magazine 321.

The axes of rotation 238 and 235 are so chosen that each station for a fuel element in the core can be brought under the aperture 271, and the elements may be replaced in groups of four as described above.

The elements stored in the magazine 321 may be removed through the water tower 317 for disposal as and when convenient by the ram used to feed new elements into the carriage 319.

The nuclear reactor is rendered critical and rendered operative as has been described above with reference to FIGURES 1 to 3.

In this embodiment of the invention the control plates can readily be removed through the aperture leading from the pressure vessel to the auxiliary pressure chamber. In many applications of the invention, the control plates will be replaced with control rods of much the same dimensions as the fuel elements, and in such an arrangement control rods may also be removed through the auxiliary pressure chamber. Where control plates or rods are to be removed, it will normally be necessary to remove some of the fuel elements first in order to ensure that removal of the control rods does not render the reactor core critical.

The amount of water that it is necessary to pump into the auxiliary pressure vessel to raise its pressure to that existing in the main pressure vessel is quite small, so that it is practical to eliminate this pump if desired and use a small bore by-pass about the valve 77 of the valve 277, this by-pass including a flow controlling stop valve which may be opened when desired to allow the flow of water through the by-pass from the main pressure vessel to the auxiliary pressure chamber and thus equalize the pressures therein.

It will be appreciated that the auxiliary pressure chamber remains constantly filled with cool liquid, whilst during the replacement of the fuel elements the temperature and pressure of the liquid within the pressure vessel are substantially unaffected. As a result operation of the nuclear reactor may quickly be resumed.

The operation of the various valves and the movements of the various magazines have been described above as actions to be carried out under the manual control of an operator. It will normally be desirable to provide interlocks between the various valves and magazines to avoid accidents due to an improper operating sequence being followed. The provision of an interlock between the valves directly associated with the auxiliary pressure vessel may be considered almost an essential in view of the serious consequences of the pressure vessel being allowed to vent through such valves and the auxiliary pressure vessel to the atmosphere.

In some instances it may be desirable, or necessary, to provide a pressure vessel with a plurality of charging and discharging apertures, as when possible lateral movement of the core within the pressure vessel is such that every element of the core cannot be brought below a single charging and discharging aperture. In such case the charging and discharging apertures may have associated therewith respective auxiliary pressure chambers or a single auxiliary pressure chamber may be used.

Although in the type of reactor described fuel elements will normally be removed and replaced, it is possible with the apparatus described to change fuel elements from station to station in the core without de-pressurizing the pressure vessel, and where fuel elements tend to deteriorate for any reason more quickly in one region of the core than in another region, it may be advantageous to rearrange the fuel elements without removing them from the pressure vessel.

I claim:
1. A pressurized water nuclear reactor comprising a pressure vessel, a core comprising a plurality of fuel elements within said vessel, means for circulating liquid coolant under pressure through said vessel in such manner as to cool the core when it is producing heat, a plurality of fuel element receiving stations provided in said core each arranged to receive one of said fuel elements, a charging and discharging aperture provided in a wall of said pressure vessel above said core, movably positionable fuel element handling means arranged to pass through said aperture, mounting means positioned within said pressure vessel below said core and arranged to support the core and to permit its transverse and rotational movement within said vessel to bring each of said stations, when desired, in alignment below said aperture, and actuating means operable from outside the pressure vessel for positioning said mounting means to bring said stations below said aperture, whereby said handling means are operable through said aperture to remove and insert said fuel elements from and into said stations when the reactor is under pressurized conditions.

2. A nuclear reactor as claimed in claim 1, wherein means are provided for indicating remotely the position of the core relatively to the charging and discharging aperture.

3. A nuclear reactor as claimed in claim 1, wherein means are provided which tend to hold the core in positions in which respective stations are operatively located in relation to the charging and discharging aperture.

4. A nuclear reactor as claimed in claim 1, wherein the core is mounted to rotate about a central upright axis on a carriage arranged to move the core laterally relative to its normal position within the pressure vessel.

5. A nuclear reactor as claimed in claim 4, wherein a single common charging and discharging aperture is adapted to serve for the withdrawal and positioning of fuel elements in relation to all the fuel element stations of the core.

6. A nuclear reactor as claimed in claim 4, wherein the carriage is movable linearly transversely of the pressure vessel.

7. A nuclear reactor as claimed in claim 4, wherein the carriage is rotatably mounted on an axis which is in a plane parallel to the upright axis of the pressure vessel.

8. A nuclear reactor as claimed in claim 1, wherein the charging and discharging aperture communicates through valve means with an auxiliary pressure chamber having provision for establishing therein a liquid pressure substantially equal to that of hot liquid coolant in the pressure vessel and having associated therewith the handling means for effecting withdrawal of an element from a station operatively positioned in relation to the aperture through the aperture and the valve means into the chamber and the insertion of an element from the chamber through the valve means and the aperture and positioning of the element at the station.

9. A nuclear reactor as claimed in claim 8, wherein the said provision includes a valve-controlled by-pass to the valve means arranged to give restricted connection between the pressure vessel and the auxiliary pressure chamber.

10. A nuclear reactor as claimed in claim 8, wherein the auxiliary pressure chamber is provided with a valve-controlled opening for the passage of elements between the chamber and a liquid-filled channel leading to a receiving chamber and associated with the auxiliary pressure chamber are transfer means for effecting discharge to the channel of elements withdrawn by the handling means from the pressure vessel and for effecting movement of elements from the channel into the auxiliary pressure chamber and positioning of the elements in that chamber for handling by the handling means.

11. A nuclear reactor as claimed in claim 10, wherein the transfer means include a rotary magazine adapted to move elements laterally within the auxiliary pressure chamber between two positions, a position above the charging and discharging aperture and a position above the valve-controlled opening.

12. A nuclear reactor as claimed in claim 10, wherein means are provided for maintaining the liquid at the opening at a pressure at least sufficient to balance the level of liquid in the auxiliary pressure chamber when full.

References Cited in the file of this patent
UNITED STATES PATENTS

| | | |
|---|---|---|
| 2,782,158 | Wheeler | Feb. 19, 1957 |
| 2,803,601 | Cooper | Aug. 20, 1957 |
| 2,868,706 | Untermyer et al. | Jan. 13, 1959 |

FOREIGN PATENTS

| | | |
|---|---|---|
| 560,765 | Belgium | Sept. 30, 1957 |

OTHER REFERENCES

TID-5275, Research Reactors, August 1955, pp. 316–317.

McLain et al.: "Problems of Nuclear Engineering," vol. 1, edited by Huges et al., Permagon Press, 1957, paper given in Cleveland, Ohio, December 12–16, 1955, 204–154.39, pages 267–277.

Schultz: Nucleonics, November 1956, pp. 138–144. 204/193.39.

Nucleonics, vol. 14, No. 12, December 12, 1956, pp. S.22–S.23 204/154.39.

---

UNITED STATES PATENT OFFICE

CERTIFICATE OF CORRECTION

Patent No. 3,089,836            May 14, 1963

William R. Wootton

It is hereby certified that error appears in the above numbered patent requiring correction and that the said Letters Patent should read as corrected below.

Column 3, line 4, for "cavity" read -- activity --; line 29, for "carried" read -- carries --.

Signed and sealed this 10th day of November 1964.

(SEAL)
Attest:

ERNEST W. SWIDER           EDWARD J. BRENNER
Attesting Officer           Commissioner of Patents